United States Patent [19]

Arbit

[11] 4,197,356
[45] Apr. 8, 1980

[54] HEAT SEALABLE PACKAGING FILM OF A POLYACRYLONITRILE SUBSTRATE COATED WITH A VINYLIDINE CHLORIDE MULTIPOLYMER

[75] Inventor: Harold A. Arbit, Highland Park, N.J.

[73] Assignee: Mobil Oil Corporation, New York, N.Y.

[21] Appl. No.: 17,676

[22] Filed: Mar. 5, 1979

[51] Int. Cl.$^2$ .................. B32B 27/08; B32B 27/30
[52] U.S. Cl. ..................................... 428/520; 428/910
[58] Field of Search ............................. 428/520, 910

[56] References Cited

U.S. PATENT DOCUMENTS

| | | | |
|---|---|---|---|
| 3,262,808 | 7/1966 | Crooks et al. | 428/518 X |
| 3,437,717 | 4/1969 | Isley et al. | 264/206 X |
| 3,755,050 | 8/1973 | Golden et al. | 428/31 |
| 4,123,576 | 10/1978 | Kobayashi et al. | 428/516 X |

Primary Examiner—J. C. Cannon
Attorney, Agent, or Firm—Charles A. Huggett; James D. Tierney

[57] ABSTRACT

The present invention is directed to improved coated film products comprising essentially a film substrate having a dry continuous adherent coating thereon formed from certain colloidally stable polymer latexes. In particular, such polymers comprise vinylidine chloride multipolymers with a relatively low pH which are coated upon the surface of an oriented polyacrylonitrile film which has been corona discharge treated prior to coating. Such coated film products exhibit improved resistance to seal strength deterioration or complete failure when the coated film products, after having been sealed, are immersed in water at room temperature or above including boiling water.

2 Claims, No Drawings

HEAT SEALABLE PACKAGING FILM OF A POLYACRYLONITRILE SUBSTRATE COATED WITH A VINYLIDINE CHLORIDE MULTIPOLYMER

BACKGROUND OF THE INVENTION

1. Field of the Invention

The present invention is concerned with oriented polyacrylonitrile films which have been coated on one or both sides with a vinylidine chloride multipolymer coating composition.

2. Description of the Prior Art

In the past thermoplastic and thermoset packaging films such as for example polyolefin films including polyethylene and polypropylene and polybutene and copolymers thereof; polyester films such as for example polyethylene terephthalate and the like have been coated with a variety of coating compositions including vinylidine chloride multipolymers to improve the heat sealability thereof as well as improving resistance of such films to oxygen and moisture vapor penetration thereof. In the past when such film materials have been coated with saran latexes having high concentrations of vinylidine chloride contained therein, and when such films were sealed and exposed to high moisture concentrations such as for example immersion in water at room temperature or above, there was a tendency of the seal to fail by delamination of the coating from the film substrate. This is particularly true in the case of saran coated polyacrylonitrile films. Prior art saran coated film structures have been described in the prior art, see for example U.S. Pat. Nos. 3,617,368 and 4,058,649.

In general, saran coating systems which have been used in the past comprise saran coatings which are commercially available in the form of latexes which are to be applied to the particular film substrate from an aqueous media. A latex, by definition, is a dispersion of spherical, polymeric particles in a range from about 0.01 up to about 1.0 micron (0.004–0.04 mils) diameter in water. Latex coating systems employed for coating applications to film substrates generally consist of from about 50% to about 60% solids with about 2% to 3% of the solids being conventional, wetting and suspending agents. On drying the applied coating, the water evaporates and the particles fuse together at their contacting surface.

SUMMARY OF THE INVENTION

The present invention provides a biaxially oriented polyacrylonitrile film having coated on at least one surface thereof a multipolymer containing a predominant amount of vinylidine chloride copolymerized with minor amounts of other monomer moieties such as for example alkyl acrylates, alkyl methacrylates, acrylonitrile, lower alkyl alpha-beta ethylenically unsaturated carboxylic acids and the like.

DESCRIPTION OF SPECIFIC EMBODIMENTS

The biaxially oriented polyacrylonitrile film utilizable herein can be prepared by casting a film from a solution of polyacrylonitrile and biaxially stretching it, using known prior art techniques. One procedure is described in U.S. Pat. No. 3,437,717, the disclosure of which is also incorporated herein by reference. A particularly preferred technique is described in U.S. Pat. No. 4,066,731, which also is incorporated herein by reference.

Briefly, this technique involves pouring a hot, concentrated solution of polyacrylonitrile in a solvent that is water-soluble, e.g., dimethyl sulfoxide, onto a film supporting surface and stripping the resulting film from said surface. The resulting film containing solvent is subjected to contact with water, preferably under constrained conditions, thereby removing the solvent from the film and replacing it with water. The film composed essentially of acrylonitrile and water is then stretched to about 1.5 to about 4 times its original dimension in both the machine direction and the transverse direction. A suitable method is by use of the drafter-tenter frame arrangement (see U.S. Pat. No. 3,437,737). While still under restrained conditions, the film is dried, thus producing biaxially oriented polyacrylonitrile contemplated for use in this invention. Such film is available commercially.

Preferably, the biaxially oriented film is prepared from polyacrylonitrile homopolymer. It is contemplated, however, to use films made from copolymers of acrylonitrile with other ethylenically unsaturated monomers, such as alkyl acrylates. Film thickness can be between about ¼ mil and about 4 mils.

As hereinbefore noted the biaxially oriented polyacrylonitrile films of the present invention are coated with vinylidine chloride multipolymer coatings containing a predominant amount of vinylidine chloride in the multipolymer structure. Such coatings serve to enhance the heat seal characteristics by increasing the heat seal temperature range and additionally, they provide barrier characteristics to the film whereby the film's resistance to the transmission of oxygen and water vapor is increased. These latter characteristics are important, particularly in packaging applications whereby the sealed film package may be exposed to conditions of relatively high humidity and in some instances the sealed film containing product may be actually immersed in water including boiling water for cooking the commodity contained in the sealed film package. Obviously there are less severe conditions of exposure to moisture such as when such coated film products are used to contain moisture emitting comestibles including such products as fresh meat and produce.

It has been found, as more fully discussed hereinafter, that particular packaging films such as for example polyethylene terephthalate which have been coated with saran coating materials exhibit excellent resistance to coating adhesion failure when immersed in liquids including water at room temperature and above and to the boiling point of water. However, in the case of oriented polyacrylonitrile films which have a surface coated with saran-type coating materials it has been found that the adhesion of normal commercially available sarans to polyacrylonitrile film surfaces, including for example sarans identified by their manufacturer as SL-112, delaminate causing seal failure when the coated substrates are immersed in water for periods of time at room temperature or are immersed in boiling water for shorter periods.

Normally, saran latexes are supplied from the manufacturer having a pH which is acidic, e.g., on the order of 1.5 to 2.0 for example. It has been normal practice in the prior art to adjust such an acidic pH upwardly to an alkaline condition for example pH=9.0.

It has now been found, however, that when the pH of the saran latex which is to be employed for top-coating oriented polyacrylonitrile films is adjusted downwardly, i.e., down to about less than 1.0 and preferably to about 0.95 and below, excellent resistance to coating delamination, when the coated films are immersed in water, results by such pH modification.

If the pH of the latex is adjusted below about 0.90, adhesion of the saran coating to the polyacrylonitrile base film begins to deteriorate.

The following Table I illustrates saran coating adhesion variations when saran type materials are coated onto the surface of films such as polyacrylonitrile and compared to saran coated upon the surface of polyester, specifically, polyethylene terephthalate. The saran coating composition, referred to in the following Table I, comprises a multipolymer of about 80–85% by weight of vinylidine chloride; and 15–20% by weight comprising acrylonitrile, methyl methacrylate, and methacrylic acid; and 1.8% sodium sulfoethyl methacrylate.

In the following Table an adhesive coated cellophane is employed to test the adhesion of the saran latex coating to the film. In the testing procedure the coated film is cross-hatched with a sharp edged instrument by making three parallel lines approximately one quarter inch apart and approximately one inch long intersected at 90° with three additional lines similarly spaced. A strip of adhesive coated cellophane approximately three inches long is pressed diagonally across the scribed squares. The tape should be pressed down firmly with the finger. The tape is then removed from the film. The removal of the tape should be a peeling back rather than a direct lifting motion, that is the angle of pull should be approximately 150° rather than 90°. The tape should be removed with a quick pull. Adhesion is rated on the basis of how much of the coating in the scribed squares is removed. No coating removal is rated 10 (No Peel) as being perfect and complete removal of the coating is rated 0 (Total Separation) as being complete failure.

TABLE I

| | Dry vs Wet Adhesion of Saran-Coated Films | |
|---|---|---|
| Exposure | Saran-Coated[1] Polyacrylonitrile Film (0.65 mil) | Saran-Coated[1] Polyethylene Terephthalate Film (0.5 mil) |
| Air at room temperature | No Peel | No Peel |
| Water at room temperature for 16 hours | Coating Peels | No Peel |
| Water at 100° C. for one hour | Total separation of coating from base film | No Peel |

[1]Dow Saran SL-112 Coating 1 lb/Ream.

As can be seen from the foregoing Table I the problem of saran coating adhesion on the surface of electronically treated polyacrylonitrile film are quite severe when contrasted to saran coated onto the surface of polyethylene terephthalate. The saran coating latex employed in the foregoing tests in Table I had a pH as received from the manufacturer of about 1.5. Attempts to overcome the saran coating adhesion loss on the polyacrylonitrile following the water exposure, described in Table I, by predrying the film or by 2-side saran coating were unsuccessful.

However, it was found that downward adjustment of the pH of the saran latex prior to coating, such adjustment being made by dilution with dilute hydrochloric acid, prevented coated delamination as shown in the following Table II.

TABLE II

| | Effect of Saran Latex pH Upon Saran Adhesion to Polyacrylonitrile | |
|---|---|---|
| Latex pH | Coating - Base Film After Water Immersion at Room Temperature for 16 Hours | Coating - Base Film After Exposure to Boiling Water for ¼ Hour |
| 0.9 | No Peel | No Peel |
| 1.5 | Total Separation | Total Separation |
| 4.0 | Total Separation | Total Separation |
| 9.0 | Total Separation | Total Separation |

It will be apparent from the foregoing Table II that the adhesion of saran multipolymers to polyacrylonitrile base films, when such laminates are exposed to immersion in water, is definitely improved by maintaining the pH of the latex used for coating below 1.0.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A coated film structure comprising an oriented polyacrylonitrile film substrate, at least one surface of said substrate being coated with a vinylidine chloride multipolymer containing a major amount of vinylidine chloride said multipolymer having been applied as a latex, said latex having a pH of from about 0.90 up to about 0.95.

2. A coated film structure in accordance with claim 1 wherein said multipolymer comprises vinylidine chloride copolymerized with at least one member selected from the class consisting of acrylonitrile; alkyl acrylates including methyl, ethyl, butyl, isobutyl, and octyl acrylates; and monoethylenically unsaturated acid including methacrylic acid and mixtures of methacrylic acid and acrylic acid.

* * * * *